June 20, 1950
G. G. ZAHM
2,512,513
APPARATUS AND METHOD FOR THE EVAPORATION
AND CONCENTRATION OF LIQUIDS
Filed Jan. 15, 1945
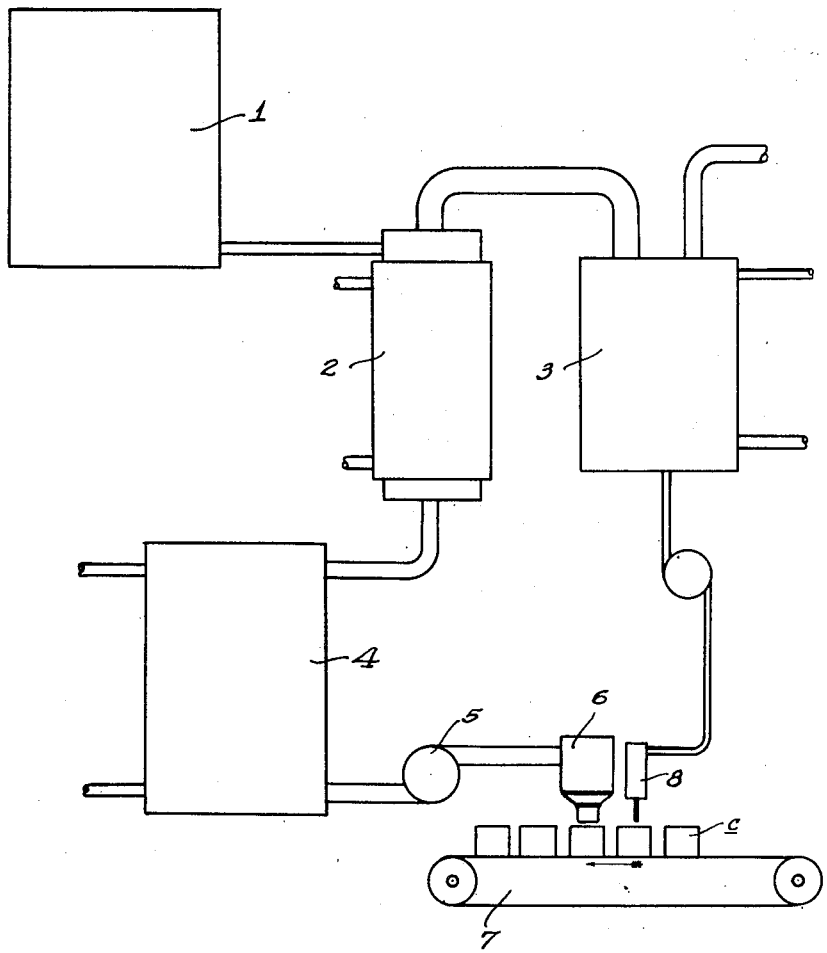
Inventor
George G. Zahm
by: Alfred W Petchaft
attorney Patented June 20, 1950

2,512,513

UNITED STATES PATENT OFFICE 2,512,513

APPARATUS AND METHOD FOR THE EVAPORATION AND CONCENTRATION OF LIQUIDS

George G. Zahm, Buffalo, N. Y., assignor to Hurd Corporation, New York, N. Y., a corporation of Delaware Application January 15, 1945, Serial No. 572,943

6 Claims. (Cl. 99—155)

This invention relates in general to apparatus and methods for the evaporation and concentration of liquids and more particularly food products such as fruit juices and the like.

Most liquid food products, juices, and beverages contain many complex substances such as vitamins and other nutritive elements which are highly sensitive to destruction by heat, oxidation, and hydrolysis. In addition to this, such liquids usually contain essential oils and delicate esters which contribute materially to the taste or flavor of the product. For this reason it has become common practice to evaporate this type of liquid under vacuum in vacuum pans and similar types of vacuum dryers or concentrators, so as to avoid the use of high temperatures. In addition to this, some efforts have been made to conduct evaporation or concentrating operations in the presence of a so-called "inert" atmosphere of carbon dioxide or nitrogen so as to overcome the danger of oxidation.

These expedients, however, have not been wholly satisfactory. Vacuum pans and other conventional vacuum dryers are most commonly operated on a batch rather than continuous basis and are therefore not particularly economical from the point of view of production costs. Furthermore, liquids of the type here under consideration ordinarily contain sugars, glucosides, and other related chemical substances which tend to increase the surface tension of the liquid and thereby produce foaming and entrainment problems in the apparatus. The employment of "inert" atmospheres to prevent oxidation has been found, in commercial practice, to be expensive and in some cases disadvantageous. For example, the so-called "inert" gases are not truly inert from a chemical point of view but are, in fact, dissolved or absorbed in the liquids and in some cases even chemically combined with the juices. Finally, where low-temperature vacuum evaporation is employed, the liquid must be pasteurized at approximately 160° F. either before or after concentration and such additional exposure to heat produces a marked deterioration in the product.

It has been found, however, in connection with the present invention, that the two vital factors in the concentration of liquid food products are speed of operation and recovery of the essential flavor-producing ingredients. If, for example, the liquid is heated very rapidly and preferably in a single operation, it is possible to avoid any material loss or damage to vitamin content. If, at the same time the highly volatile, delicate flavor-producing ingredients are recovered and restored to the concentrate, it is possible also to preserve substantially all of the flavor characteristics of the natural product.

It is therefore one of the principal objects of the present invention to provide apparatus and methods for concentrating or evaporating liquid food products without losing, impairing, or destroying the vitamins, flavor-producing ingredients, and other component substances within the liquid.

It is a further object of the present invention to provide apparatus and methods of the type, and for the purposes stated, by which liquids such as fruit juices and the like may be evaporated continuously and at an extremely rapid rate so that each particular portion of the liquid being processed will be exposed to processing conditions for such a short period of time that the method may, for all practical purposes, be referred to as instantaneous pasteurizing evaporation.

It is another and very important object of the present invention to provide apparatus and methods for the evaporation and concentration of liquid food products whereby the esters and other flavoring constituents normally lost during evaporation may be efficiently recovered and restored to the concentrate, thereby preserving, unharmed and unchanged, the original and natural qualities of aroma and taste normally present in fresh unprocessed liquids.

It is an additional object of the present invention to provide apparatus and methods for concentrating and evaporating fruit juices and the like under relatively high vacuum and without loss of efficiency due to foaming or entrainment.

The above and other objects will become more fully apparent from the following specification which, by way of illustration rather than limitation, sets forth preferred processes and preferred forms of apparatus constituting embodiments of the present invention, the scope of which is defined in the appended claims.

In the drawings (one sheet), the single figure is a schematic view of a preferred form of apparatus embodying the present invention.

Referring now in more detail and by reference characters to the drawings, the juice, extract, or beverage is introduced into a holding tank 1, after having been squeezed, extracted, or otherwise prepared in conventional equipment (not shown) and may be held therein under an inert atmosphere of nitrogen, helium, or carbon dioxide to counteract the deleterious effect of oxygen in ordinary air, although it is clearly preferable to process such liquids as rapidly as possible. From the holding tank 1, the liquid flows directly to a high-vacuum concentrating column 2 and high-vacuum ester-recovery fractional condenser 3 arranged and operating in the manner more particularly described in my co-pending application Serial No. 489,224, now Patent No. 2,423,746.

The heavy concentrate flows from the column 2 into a high-vacuum flash-pasteurizer 4 and is withdrawn by a pump 5 for delivery to a can-filler 6, which is of any conventional design and adapted to operate in timed relation to a can-conveyor 7, so as to introduce into each can c a precise, measured quantity of the concentrate. Also arranged for timed co-operation with the conveyor 7, is a small filling apparatus 8 preferably located "ahead" of the can-filler 6, so that each can c will pass beneath it prior to reaching the filler 6.

The ester-condensate from the high-vacuum condenser 3 is withdrawn by a pump 9 and delivered to the filling apparatus 8, which in turn injects a small measured quantity of the ester-condensate into the bottom of each empty can c. Immediately thereafter, the can is moved beneath the can-filler 6 and receives its content of concentrate. By the use of athermanously insulated pipe-lines and containers, and by operating on a very rapid time-schedule, the heavy concentrate can be filled into the cans c at pasteurizing temperature so that the can and the ester-concentrate which has just previously been injected therein will be automatically pasteurized without further process steps or additional equipment. In fact, the cans c may be immediately transported to can-sealing machinery (not shown) and, after sealing, quickly chilled so that the total time during which the liquid is passing through the column 2, the flash-pasteurizer 4, and the can-filler 6 is but a matter of two or three minutes at the very maximum. It should be pointed out in this connection that the hot concentrate flows into each can c so rapidly that it blankets the ester-condensate so completely that none of the latter is lost due to volatilization. In actual practice, it has been found that the high temperature causes the ester-concentrate to volatilize at the bottom of the can and bubble up through the concentrate. Due to the high viscosity of the concentrate and also to the high solubility of the ester-condensate therein, the ester-condensate is completely blanketed and absorbed in the concentrate and does not escape during the relatively short interval before the can is hermetically sealed. As a result, the ester-condensate is more or less uniformly dispersed throughout the concentrate and it is not necessary to mechanically agitate the cans.

It should be understood that changes and modifications both in the methods, as well as in the form, construction, arrangement, and combination of the several parts of the apparatus for evaporating or concentrating liquids may be made and substituted for those herein shown and discussed without departing from the nature and principle of the present invention.

Having thus described my invention, what I claim and desire to secure by Letters Patent is:

1. The method of concentrating liquid food products containing easily volatilized flavoring constituents, which method comprises passing the liquid quickly through a single pass evaporator under high vacuum, fractionally condensing the vapors produced in the evaporator to abstract therefrom in concentrated form condensible flavor-containing liquid, pasteurizing the concentrate, placing a measured quantity of the concentrated flavor-containing liquid in a container, and thereupon filling the container with concentrate while said concentrate is still at a temperature within pasteurization range.

2. The method of concentrating liquid food products containing easily volatilized flavoring constituents, which method comprises passing the liquid quickly through a single pass evaporator under high vacuum, fractionally condensing the vapors produced in the evaporator to abstract therefrom in concentrated form condensible flavor-containing liquid, pasteurizing the concentrate, placing a measured quantity of the concentrated flavor-containing liquid in a container, thereupon filling the container with concentrate while said concentrate is still at a temperature within pasteurization range so that the volatile flavor-containing liquid will begin to bubble up through the concentrate for absorption therein, and immediately sealing the container thereby preventing escape of any volatilized flavor-containing liquid.

3. The method of concentrating liquid food products containing easily volatilized flavoring constituents, which method comprises passing the liquid quickly through a single pass evaporator under high vacuum, condensing the vapors produced in the evaporator to abstract therefrom in concentrated form condensible flavor-containing liquid, pasteurizing the concentrate, placing a measured quantity of the concentrated flavor-containing liquid in a container, and thereupon filling the container with concentrate while said concentrate is still at a temperature within pasteurization range.

4. The method of concentrating liquid food products containing easily volatilized flavoring constituents, which method comprises passing the liquid quickly through a single pass evaporator under high vacuum, condensing the vapors produced in the evaporator to abstract therefrom in concentrated form condensible flavor-containing liquid, pasteurizing the concentrate, placing a measured quantity of the concentrated flavor-containing liquid in a container, thereupon filling the container with concentrate while said concentrate is still at a temperature within pasteurization range so that the volatile flavor-containing liquid will begin to bubble up through the concentrate for absorption therein, and immediately sealing the container thereby preventing escape of any volatilized flavor-containing liquid.

5. The method of concentrating liquid food products containing easily volatilized flavoring constituents, which method comprises passing the liquid through a single pass evaporator under high vacuum thereby separating the liquid into a concentrate portion and a vapor portion, condensing the vapor portion to abstract therefrom a liquid condensate fraction containing a relatively high concentration of flavor-producing esters, pasteurizing the concentrate portion immediately as it flows from the evaporator, placing a measured quantity of the ester containing condensate fraction in the bottom of a container, immediately thereafter filling the container with the concentrate portion while said concentrate portion is still at a temperature within the pasteurization range, and immediately sealing the container before the volatile ester containing fraction has bubbled up entirely through the concentrate portion and escaped therefrom.

6. The method of concentrating liquid food products containing easily volatilized flavoring constituents, which method comprises passing the liquid through a single pass evaporator under high vacuum thereby separating the liquid into a concentrate portion and a vapor portion, condensing the vapor portion to abstract therefrom a liquid condensate fraction containing a relatively high concentration of flavor-producing esters, pasteurizing the concentrate portion immediately as it flows from the evaporator without breaking the vacuum, placing a measured quantity of the ester containing condensate fraction in the bottom of a container, immediately thereafter filling the container with the concentrate portion while said concentrate portion is still at a temperature within the pasteurization range, and immediately sealing the container before the volatile ester containing fraction has bubbled up entirely through the concentrate portion and escaped therefrom.

GEORGE G. ZAHM.

REFERENCES CITED

The following references are of record in the file of this patent:

UNITED STATES PATENTS

| Number | Name | Date |
|---|---|---|
| 48,268 | Gale | June 20, 1865 |
| 1,079,474 | Davis | Nov. 25, 1913 |
| 1,189,127 | Kellogg | June 27, 1916 |
| 1,847,485 | Kantor | Mar. 1, 1932 |
| 2,098,961 | Fronmuller | Nov. 16, 1937 |
| 2,103,158 | Kantor | Dec. 21, 1937 |
| 2,286,999 | Smith | June 16, 1942 |
| 2,291,604 | Baselt | Aug. 4, 1942 |
| 2,303,021 | Butty | Nov. 24, 1942 |

FOREIGN PATENTS

| Number | Country | Date |
|---|---|---|
| 498,305 | Great Britain | 1939 |